(12) United States Patent
Ramanathan et al.

(10) Patent No.: US 11,907,346 B1
(45) Date of Patent: Feb. 20, 2024

(54) FACIAL FEATURE ANALYSIS FOR AUTHENTICATION

(71) Applicant: Wells Fargo Bank, N.A., San Francisco, CA (US)

(72) Inventors: Ramanathan Ramanathan, Bellevue, WA (US); Chris Theodore Kalaboukis, San Jose, CA (US); Rameshchandra Bhaskar Ketharaju, Hyderabad (IN); Andres J. Saenz, Redmond, WA (US); Andrew J. Garner, IV, State Road, NC (US); Abhijit Rao, Irvine, CA (US); Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 492 days.

(21) Appl. No.: 17/248,249

(22) Filed: Jan. 15, 2021

(51) Int. Cl.
 *G06F 21/00* (2013.01)
 *G06F 21/32* (2013.01)
 *G06V 40/16* (2022.01)

(52) U.S. Cl.
 CPC ............ *G06F 21/32* (2013.01); *G06V 40/171* (2022.01); *G06V 40/172* (2022.01)

(58) Field of Classification Search
 CPC ..... G06F 21/32; G06V 40/171; G06V 40/172
 See application file for complete search history.

(56) References Cited

U.S. PATENT DOCUMENTS

| | | | |
|---|---|---|---|
| 8,160,309 B1* | 4/2012 | Tzur | H03F 3/217 382/118 |
| 9,117,109 B2 | 8/2015 | Nechyba et al. | |
| 9,652,663 B2 | 5/2017 | Lau et al. | |
| 10,108,961 B2 | 10/2018 | Wang et al. | |
| 10,331,941 B2 | 6/2019 | Rhee et al. | |
| 10,430,645 B2 | 10/2019 | Mostafa et al. | |
| 10,657,363 B2 | 5/2020 | Alameh et al. | |
| 2009/0140838 A1* | 6/2009 | Newman | G06Q 20/40145 340/5.83 |
| 2013/0114865 A1* | 5/2013 | Azar | G07C 9/37 726/19 |
| 2016/0132670 A1* | 5/2016 | Salama | G06V 40/172 726/19 |
| 2016/0364561 A1* | 12/2016 | Lee | G06F 21/32 |
| 2017/0364897 A1* | 12/2017 | Sarkar | G06Q 30/0643 |

(Continued)

OTHER PUBLICATIONS

Le, Vuong Van, "3D Face Processing for Animation and Biometrics (Dissertation)", UMI No. 3646555, (2014), 106 pgs.

(Continued)

*Primary Examiner* — Jeffrey C Pwu
*Assistant Examiner* — William A Corum, Jr.
(74) *Attorney, Agent, or Firm* — SCHWEGMAN LUNDBERG & WOESSNER, P.A.

(57) ABSTRACT

Systems and methods may generally be used to authenticate a user. An example method may include capturing an image of a portion of a face of a user, retrieving, based on identification information, a registered model of the face from a database, and comparing the portion of the face in the captured image to a facial feature of the registered model. In response to determining that the portion of the captured image matches the facial feature of the registered model, the method may include granting access to secure content.

20 Claims, 7 Drawing Sheets

(56) References Cited

U.S. PATENT DOCUMENTS

| | | |
|---|---|---|
| 2019/0166119 A1* | 5/2019 | Hecker .................. G06V 40/70 |
| 2019/0213314 A1 | 7/2019 | Gordon |
| 2019/0244010 A1 | 8/2019 | Kim et al. |
| 2020/0184053 A1 | 6/2020 | Kursun |
| 2020/0210562 A1 | 7/2020 | Tussy |

OTHER PUBLICATIONS

Sun, Yi, "Spatio—Temporal 3D Facial Surface Analysis For Recognition (Dissertation)", UMI No. 3522499, (2012), 190 pgs.

* cited by examiner

FACIAL FEATURE ANALYSIS FOR AUTHENTICATION

BACKGROUND

When a user seeks to access a secure asset, authentication may be used to verify the user's identity or credentials. Secure assets may include secure areas (e.g., of a building, a vehicle, a country, etc.), secure devices (e.g., a safe, a cabinet, etc.) or secure digital assets (e.g., a website, a database, a phone, etc.). Many authentication techniques exist, such as techniques using keys, passwords, biometrics, or the like. As the sophistication of authentication techniques increases, so too do attempts at circumventing access controls.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
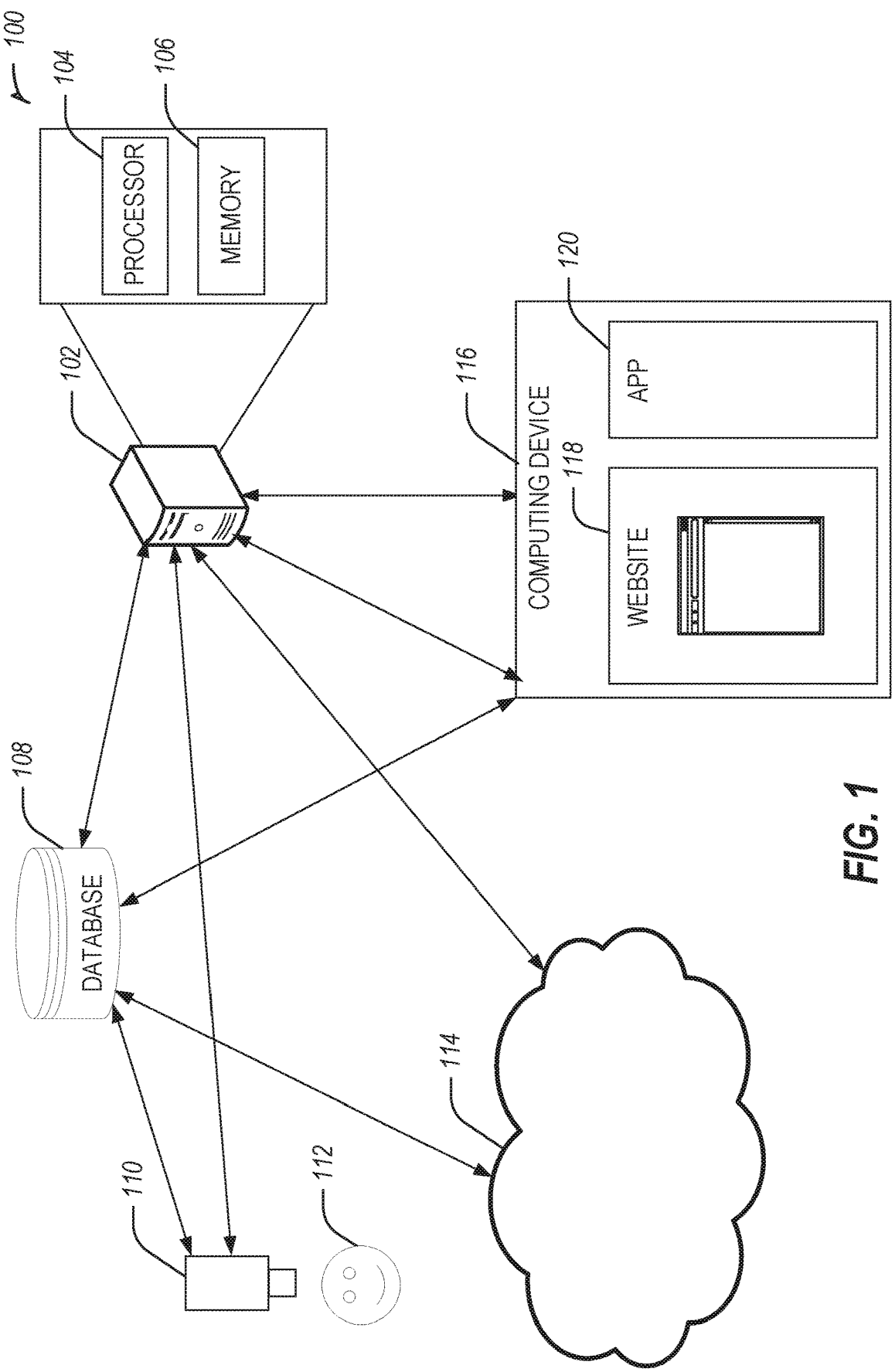
FIG. 1 illustrates a system for authenticating a user in accordance with some embodiments.

The systems and methods described herein may be used to authenticate a user based on a facial feature of the user. The facial feature may include a portion of a face of the user, which may be preselected or determined automatically. The facial feature may be compared to a stored facial feature, such as a preregistered image or model of the face of the user. The authentication may be used to grant access to the user to secure content, such as a physical space or a digital asset.

The systems and methods discussed herein may use three-dimension (3D) analysis of the face of the user for authenticating the user based on the facial feature. In some examples, the facial feature may include a portion of the face, such as an ear, a nose, a mouth, an eyebrow of the user, or a combination of portions, such as the eye and eyebrow, a hairline and top of ear, etc.

In an example, a method may include generating a 3D model of the face of the user for authentication, comparing the 3D model to a user-registered particular portion of the user's face (e.g., ear, eye), which may be selected or personalized by the user. The method may include a time component, such as for capturing and comparing a mannerism or gesture of the portion of the user's face or facial feature (e.g., the user moves the ear, winks twice, etc).

The 3D model of the facial feature may be captured and stored, and a subsequent image or video capture may occur of the facial feature when the user attempts to access secure content. The subsequent capture may be compared to the 3D model. In some examples, a 3D model of the user's entire face may be stored, in other examples only the facial feature identified (or set of facial features) may be stored. The user may register the 3D model with a particular facial feature identified (e.g., a preselected facial feature). The user may select to register a gesture when registering the 3D model.

The user selected facial feature may act as a secondary authentication protection. For example, the user selected facial feature may be kept private, such that the user knows which facial feature was selected, and is asked to provide the selection when attempting to authenticate. The personalized portion of the face of the user may be registered (e.g., on a stored model). In some examples, the user may select the facial feature. In other examples, the facial feature may be determined automatically (e.g., using machine learning or comparison to a set of facial features, such as common or average facial features) to identify a unique or most unique facial feature of the particular user. In still other examples, an automated process may identify a set of unique or likely unique facial features of the user and present the set to the user for selection of one or more of the set.

In an example, a new 3D model of the face of the user or the facial feature may be generated based on images or video captured for user with a camera of the user, such as a mobile device (e.g., cell phone), computer, or the like, or with a third party camera, such as at an ATM, a security camera, etc. In some examples, though the entire face may be captured, only the facial feature (e.g., as selected by the user or automatically determined by a processor) may be stored or sent for comparison.

The storage or sending of only a portion of a captured image or video, or generated model (e.g., only a user selected facial feature) may allow for reduce resources needed. For example, by only rendering or authenticating based on a small portion of the user's face (e.g., the selected portion), bandwidth, processing power, battery drain, power consumption, or the like may be saved. The processing, in one example, may occur using the cloud or edge computing infrastructure (e.g., an edge server or edge container), such as on a 5G network. In some examples, the computational device may be functionally close (e.g., a small or minimal number of network connections) to the camera that captures the image or video.

The systems and methods described herein may be used to authenticate a user even when potions of the face of the user are obscured (e.g., by a mask, by glasses, by a hat, etc.). By focusing on a particular or selected facial feature that is not covered, the user may be authenticated.

FIG. 1 illustrates a system 100 for authenticating a user 112 in accordance with some embodiments. Although the system 100 is shown with separate devices, some may be combined in a single device in some examples. In some examples, aspects of the system 100 may be omitted.

The system 100 includes a capture device camera) 110 to capture a face or portion of the face of a user 112. The capture device 110 may send an image, a video, audio, or the like to a first computing device 102, a networked device, or to a database 108. The capture device 110 may be part of the first computing device 102 or a separate device. The capture device 110 may edit the image, video, audio, etc., before sending to the first computing device 102, a network device, or the database 108. For example, the capture device 110 may crop an image or video file based on an identified or selected facial feature. In another example, the first computing device 102 (or a subsequent computing device) may edit the image or video file.

The first computing device 102 includes a processor 104 and memory 106, The memory 106 may be used to store instructions, which may cause the processor 104 to perform operations of the techniques described herein. The system 100 includes a second computing device 116, which may include a display for presenting information, such as via a website 118 or an application 120 (e.g., an app), The information displayed may include a secure asset, accessible after authentication, for example. The system 100 optionally includes a database 108 or an edge or cloud infrastructure 114 (of which the first computing device 102 may be a part). These components may be used to store or process information, such as to compare a portion of a face of the user 112 (e.g., corresponding to a selected or identified facial feature or gesture) to a portion of a stored 3D model (optionally including a gesture or time-based component, which in some examples may be referred to as a 4D model). The comparison may be used to authenticate the user 112, such as to grant the user 112 access to a secure asset.

In an example, the capture device 110 may be used to generate a 3D model, such as by capturing one or more images of the user 112. The 3D model may be generated by the first computing device 102 or using processing resources of one or more other computing devices (e.g., via the edge or cloud infrastructure 114, the second compute device 116, etc.). The 3D model may be stored in the database 108. When the user 112 later attempts to access secure content, a device (e.g., the second computing device 116) may be used to authenticate the user 112 by retrieving the 3D model or a portion of the 3D model (e.g., a preselected facial feature) from the database 108. The 3D model may be stored along with or include data about the 3D model, such as the preselected facial feature. The 3D model may include a face, a body, clothing, a voice print, a gait, mannerisms, a gesture, or the like. In an example, information sent out from the database 108 may be a portion of the 3D model. In one example, the portion of the 3D model may be used to authenticate the user without identifying the user (e.g., the user is unidentifiable by the portion of the 3D model). In this example, the portion of the 3D model may be identified by a number, such as a random number, an encrypted name or encrypted information, or the like. In an example, the 3D model and a comparison of facial features or gestures may be used as a part of an authentication process that also includes other aspects, such as a password, biometrics, key card, etc.

The cloud infrastructure 114, the first computing device 102, or the second computing device 116 may be used to run a machine learning model to generate a unique, most unique, or likely unique facial feature, to compare a captured facial feature to a stored facial feature (or set of facial features), or to select a facial feature automatically.

Figure 2:
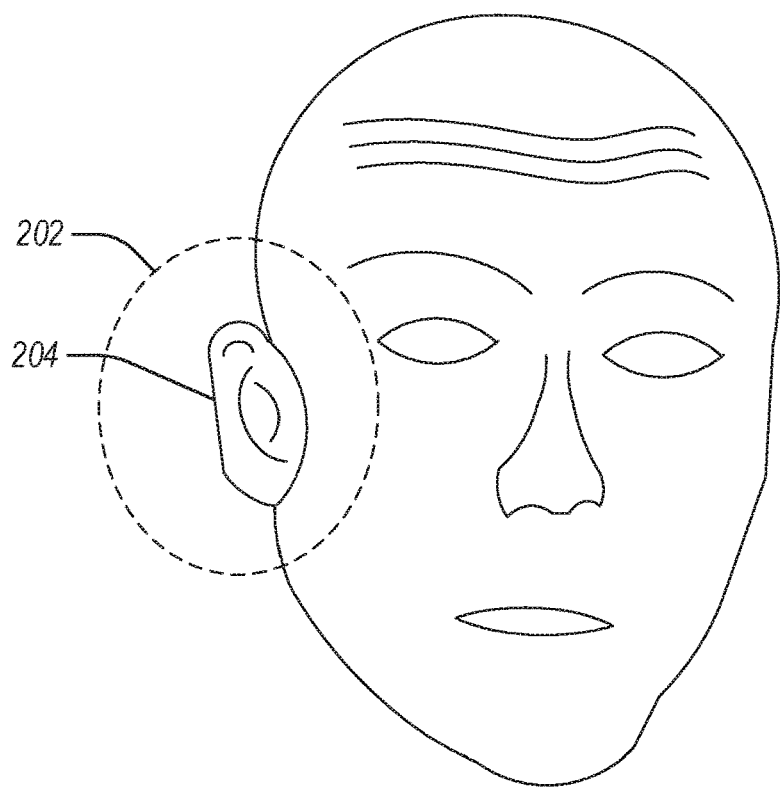
FIG. 2 illustrates a diagram of a face including a facial feature in accordance with some embodiments.

FIG. 2 illustrates a diagram of a face 200 including a facial feature 204 in accordance with some embodiments. The facial feature 204 is highlighted in FIG. 2 to illustrate a capture area 202. The capture area 202 may be captured or may be selected by editing a larger image or video, such as before being stored or sent. The capture area 202 may be selected by a user, such as by touching the facial feature 204 on an image or by drawing (e.g., free hand or using a drawing tool, such as a circle drawing tool) around the facial feature 204. In another example, the capture area 202 may be automatically generated (e.g., after user selection of the facial feature 204, or based on an automatic selection of the facial feature 204, such as without user input).

The face 200 may be captured via a camera as part of an image or a series of images (e.g., video). After capture, the image or series of images may be used to generate a 3D model of the face 200 or just the facial feature 204 or the capture area 202. The 3D model may include a time aspect, such as when the face facial feature 204 is captured performing a gesture. The gesture may be a whole face gesture or a gesture with only a portion of the face 200 (e.g., the facial feature 204). The capture area 202 may be configured to capture an entirety of the gesture. For example, the capture area 202 may be set after capturing the facial feature 204 moving, such that the movement of the facial feature 204 is contained within the capture area 202. In some examples, the capture area 202 may coincide with the facial feature 204, or coincide but also include a buffer area (e.g., a centimeter or a few centimeters around the facial feature 204). In some examples, the capture area 202 may change as a gesture is captured. The capture area 202 may first be closely cropped around the facial feature 204, but as the facial feature moves, the capture area 202 may be expanded or move with the facial feature 204. For example, when the facial feature 204 is an ear, the movement may be small compared to movement of a lip or eyebrow, and the capture area 202 of the ear may be smaller (even with the gesture) than that of a capture area corresponding to the lip or the eyebrow.

In an example, the facial feature 204 may be hidden or not identified. In this example, the user may be unaware (not know) the facial feature 204 that is selected. Instead, the facial feature 204 may be selected using a machine learning model. The machine learning model may receive a 3D model or an image as an input, and output a most unique, threshold unique, or selected facial feature to user. The uniqueness may be related to the user's face, such as a feature least like others in a set or determined based on training (labeled or unlabeled) samples used to train the machine learning model. In an example, the machine learning model may be trained using a set of images, models, or videos of different faces or facial features (real or synthesized). The machine learning model may be trained to output a feature of an input face that least corresponds to respective features in the training set, in an example. The output of the machine learning model may include a facial feature, which may be stored anonymously or in an encrypted format, such that the particular facial feature selected is not discoverable or known to the user or an operator of a system for authentication.

Figure 3:
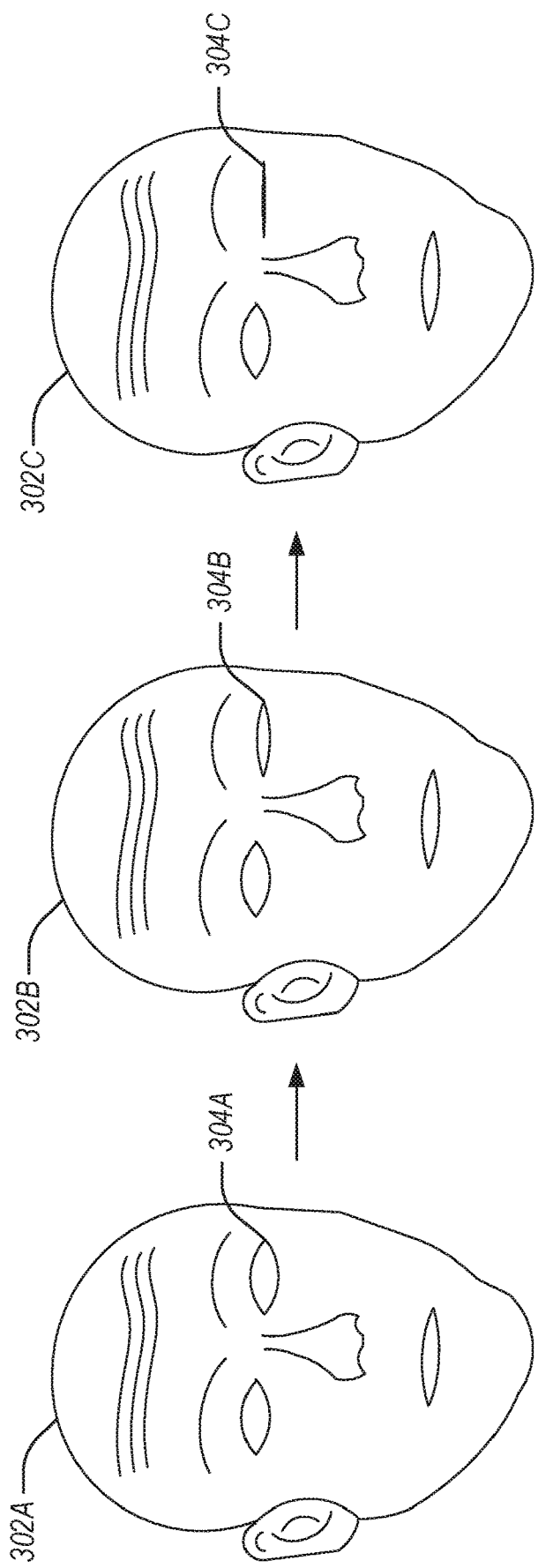
FIG. 3 illustrates diagrams of a face including a gesture in accordance with some embodiments.

FIG. 3 illustrates diagrams of a face including a gesture in accordance with some embodiments. The face is shown in three different time instances 302A, 302B, and 302C, which are shown sequentially. In the first instance 302A, the face has a facial feature (e.g., an eye) in a first state 302A. In the second instance 302B, the face has the facial feature (e.g., the eye) in a second state 304B. In the third instance 302C, the face has the facial feature (e.g., the eye) in a third state 304C. The three instances represent a gesture occurring over time. In the example shown in FIG. 3, the facial feature is an eye, and the eye is winking.

The facial feature gesture may be stored as a series of images, as a video, or the like. In an example, only the facial feature in each state 304A-C is stored and the remainder of the face is not stored. Storing only the facial feature may include storing a buffer portion surrounding the facial feature. The entire face may be captured, or only the facial feature may be captured. In an example, the entire face may be captured in the first instance 302A or the first and second instances 302A-B, and only the facial feature may be captured in subsequent instances. For example, a processor may determine where movement occurs from one instance to the next, and only capture information corresponding to an area of the movement. In some examples, a change vector may be stored along with the first instance 302A to indicate changes from the first instance 302A without needing to store future instances as images.

As few as two instances or more than three instances may be used to capture a facial feature gesture. For example, the first state 304A and the third state 304C may be sufficient to identify the gesture (e.g., winking). In other gestures, more than three images may be required or useful for accurately identifying the gesture. For example, a more complex gesture may include mouthing or saying a word or phrase. Other gestures may include moving an ear, raising an eyebrow, flaring a nostril, moving the lips or mouth, sticking out the tongue, licking the lips, smiling, frowning, making another face emotion, wrinkling the forehead, sucking in a cheek, moving an eye (e.g., rolling the eyes, looking left, right, or down, or some more complex eye gesture), puffing out a cheek, or the like.

While the above examples are described as including a gesture, in some examples (with or without a gesture), the instances (e.g., two or more) may have ambient features change. For example, a stimulus may be activated, which results in a difference between instances captured before and after the stimulus is activated. Example stimuli may include a change in ambient light, such as a user activating a light on their face, a change in a light pattern or color, a high pitched noise (which may cause an involuntary action, such as a flinch), a change in background music, or the like.

Figure 4:
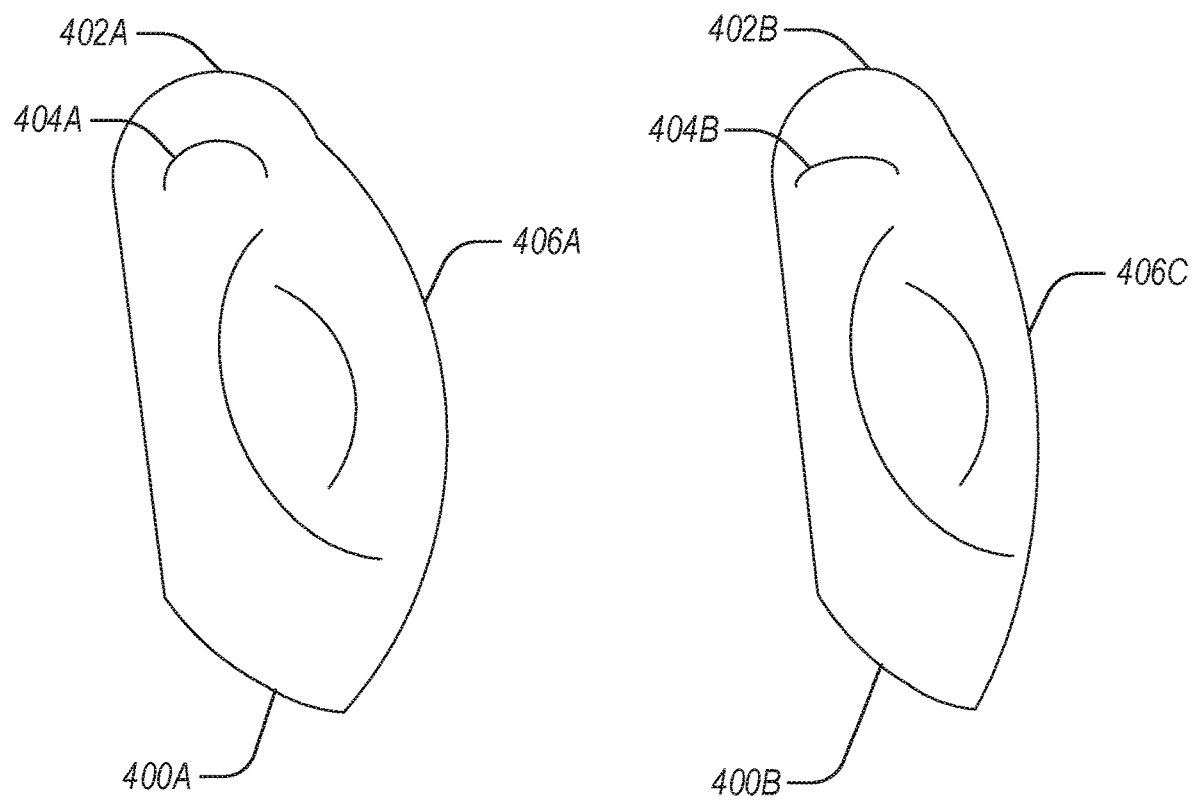
FIG. 4 illustrates a diagram showing a comparison of a facial features in accordance with some embodiments.

FIG. 4 illustrates a diagram showing a comparison of a facial features in accordance with some embodiments. FIG. 4 includes a first capture 400A of a facial feature and a second capture 400B of a facial feature. For convenience, the facial feature is shown in only two captures, but may be compared over a video or series of images or using a 3D or 4D model (e.g., with a gesture or other time-based aspect). The two captures are also discussed herein as both being related and not related for convenience.

The first capture 400A includes a set of sub-features 402A, 404A, and 406A. In some examples, the first capture 400A may be compared to the second capture 400B in its totality, and in other examples, the sub-features may be compared individually (and optionally the totality may be compared as well). The sub-features may indicate points of interest on the facial feature, such as points that are more likely to vary across a population. The differences between the captures or one or more sub-features of the captures may be compared to a threshold sameness, such as more likely than not to be the same feature or sub-feature, greater than 75%, greater than 90%, etc. This threshold may be set in some examples based on the uniqueness of the feature or the sub-feature. In an example, the threshold may be set based on a desired security level for a secure asset (e.g., for highly confidential information, a higher threshold may be used than for less confidential information).

The first capture 400A may be captured when a user requests access to a secure asset. The first capture 400A may be compared to the second capture 400B in an authentication determination, and if the first capture 400A matches (or matches above a threshold) the second capture 400B, the user may be authenticated and granted access to the secure asset. The second capture 400B may be retrieved from storage (e.g., from a database) when authenticating the user. The second capture 400B may include an image captured of the user at a previous time (e.g., during a registration). The authentication may include comparing the entirety of the captures, sub-features, a gesture, other time-based aspects, or the like. In an example, the feature may be a preselected feature (e.g., the user may select the facial feature at registration or otherwise before the authentication attempt). The specific example of FIG. 4 shows an ear, which may be a unique example where variance is higher among the population than other facial features.

Figure 5:
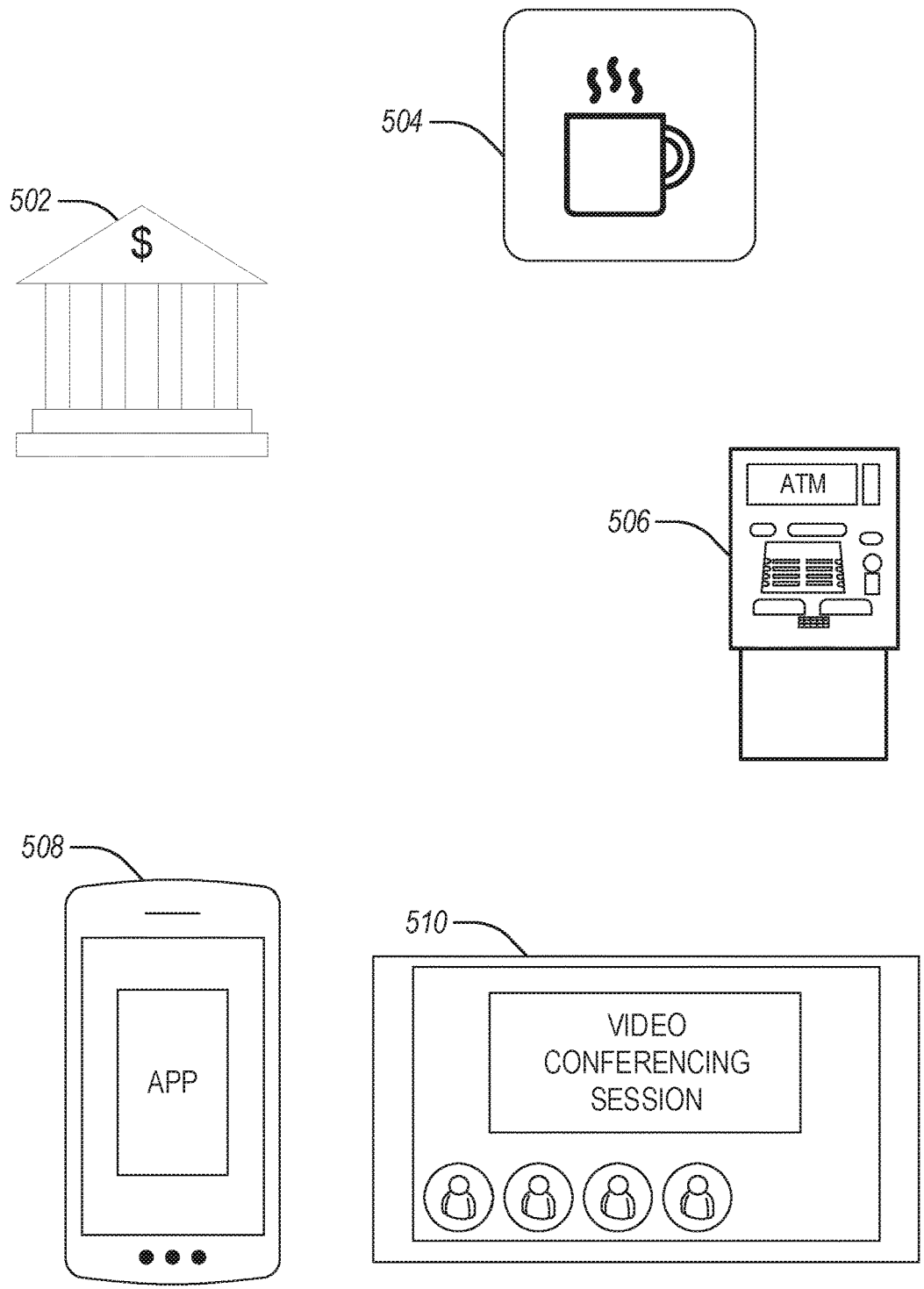
FIG. 5 illustrates a diagram showing various secure assets accessible after authentication in accordance with some embodiments.

FIG. 5 illustrates a diagram 500 showing various secure assets accessible after authentication in accordance with some embodiments. The secure assets displayed in the diagram 500 are not intended to be limiting, and other secure assets may be used with the systems and methods described herein. Further, the secure assets displayed in the diagram 500 may be accessed individually, and are displayed together for convenience (also, secure assets may be used in combination). The secure assets of diagram 500 include physical and digital secure assets.

The secure assets of diagram 500 may be accessed using any of the authentication techniques described herein. In some examples, a secure asset may be accessed in a transaction or action subsequent to an initial authentication, and an authorization for subsequently accessing this secure asset may include using an updated model, facial feature, or the like. For example, a user may initially be authenticated at a bank 502, an ATM 506, or a user device 508 (e.g., a mobile phone, a computer, a tablet, etc., such as via an app, a website, a secure message, etc.). Then, subsequently, the user may be authenticated at a a shop 504 (e.g., a coffee shop, a retail shop, a restaurant, a sales kiosk, etc.) using an update to the model or facial feature originally used to authenticate the user at the bank 502, the ATM, 506, or the user device 508. The updated model or facial feature may include aspects of a user during a time period (e.g., an hour or hours, a day, a week, a month, etc.), such as clothing, glasses, hair, shoes, gait, voice, etc.

A physical secure asset may include access to a location (e.g., entry through a door, such as a rental house, a workplace, etc.), access to a physical secured box or small area (e.g., a bank vault, a safe deposit box, etc.), or access to control or possess a physical object (e.g., cash via the ATM 506, mail or a package at a post office, a bike or car, coffee, food, or purchased items at the shop 504, or the like), A digital secure asset may include access to a digital currency (e.g., funds), access to features or aspects of an app, a website, a storage device, etc., access to a video conferencing session, access to an operating system, access to remote digital assets, access to a chat room or messaging program or protocol, or the like.

In some examples, all of the secure assets or a set of the secure assets shown in diagram 500 may use a single facial feature (which may include a gesture) to authenticate a user. In another example, each secure asset or each set of secure assets may have a unique facial feature or gesture to authenticate a user. For example, the bank 502, the ATM 506, and a banking app on the user device 506 may be operated by a single organization and share a facial feature, while a video conferencing session 510 the shop 504 may each respectively have a different facial feature or gesture to authenticate a single user. In another example, the bank 502, the ATM 506, and a banking app on the user device 508 may each have a dedicated facial feature or gesture for authentication. For example, a facial feature for the bank 502, the ATM 506, and the banking app on the user device 508 may all use an eye and eyebrow of a user to authenticate the user, with the bank 502 requiring no gesture, the ATM 506 requiring a wink gesture, and the banking app requiring an eyebrow raise. These different combinations provide further security for the user, since they may be kept secret. In some examples, the user device 508 may authenticate the user once for a set of apps, websites, or storage assets. In other examples, different apps, websites, or storage assets accessed using the user device 508 may have a different facial feature or gesture.

The video conferencing session 510 may provide continuous (e.g., every millisecond, second, minute, etc) or on demand (e.g., by a remote participant or by a notification from an AI) authentication of a user in the video conferencing session 510. For example, the authentication technique may authenticate a particular facial feature repeatedly throughout the video conferencing session 510. In some examples, the 3D model or a portion of the 3D model may be stored locally on a device running the video conferencing session 510 such that the authentication may occur without needing to go to a server to access the 3D model.

In an example where a user moves throughout a physical space (e.g., the bank 502, the shop 504, or other public or private areas), a 3D model may be dynamically updated or the user may be continuously authenticated. The 3D model may be continuously self-learning. In an example, an alternate model in a specific scenario may be generated, such as when the user is in the bank 502, on the video conferencing session 510, or during a mobile app session. The self-learning model may add specific details about the user that day or time period (e.g., the user is wearing glasses, wearing specific clothing, wearing a mask, etc.). The self-learning model may be adjusted from a generic or user-specific stored model to include daily or time-specific details for that session/day/meeting (which can be discarded or incorporated to update model after, in some examples). A detail used by a self-learning model may include shoes, glasses, jewelry, watch, accessories, clothes with a pattern, etc. The self-learning model may be time-specific (e.g., only valid within a time period, such as an hour, a day, a week, etc.). The time-specific model may be used with other linked systems (e.g., the shop 504 may use an auto pay by authenticating the user with the daily model, generated based on a trip to the bank 502, without needing secondary authentication).

Figure 6:
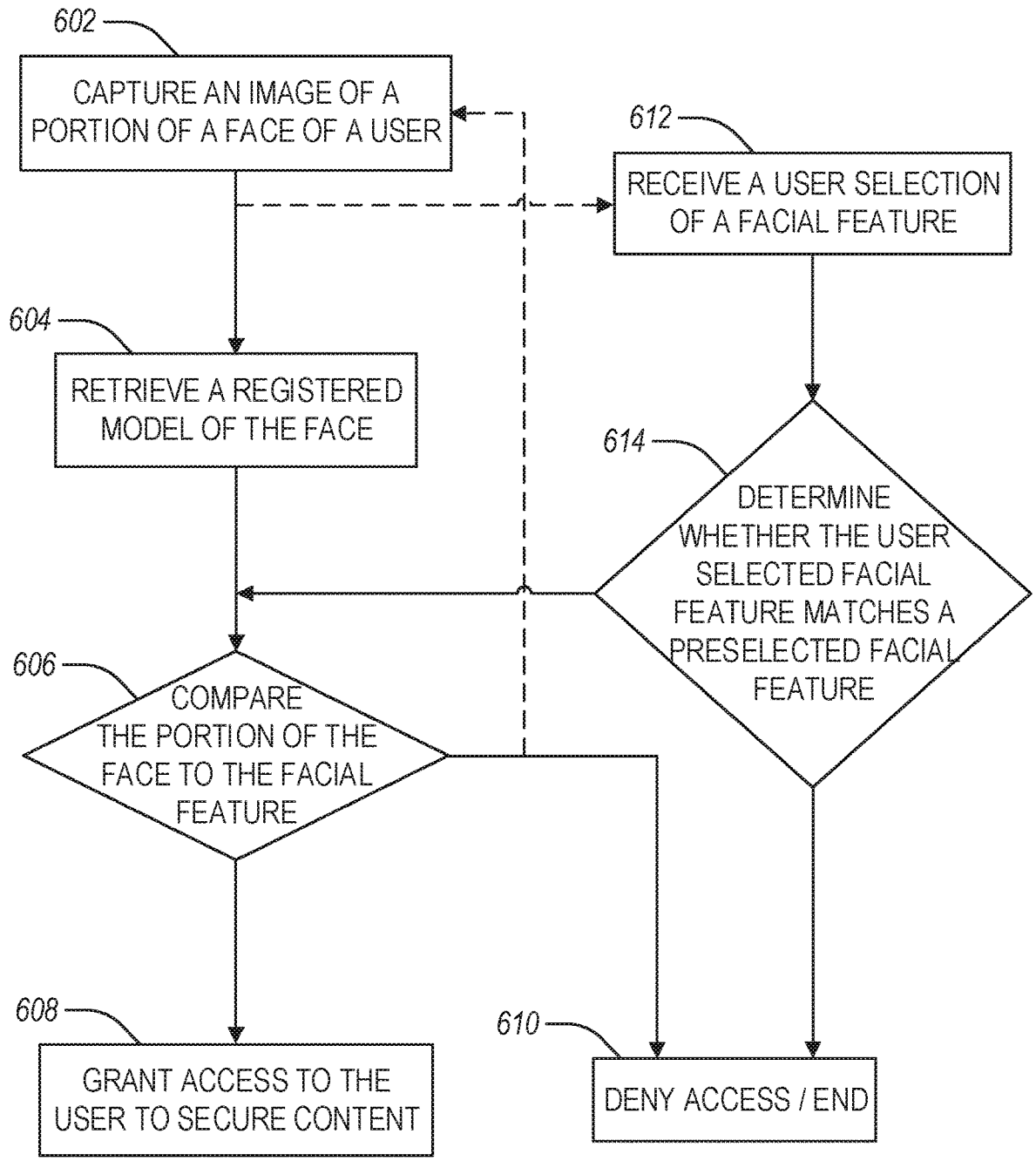
FIG. 6 illustrates a flowchart showing a technique for authenticating a user in accordance with some embodiments.

FIG. 6 illustrates a flowchart showing a technique 600 for authenticating a user in accordance with some embodiments. In an example, operations of the technique 600 may be performed by processing circuitry, for example by executing instructions stored in memory. The processing circuitry may include a processor, a system on a chip, or other circuitry (e.g., wiring). For example, technique 400 may be performed by processing circuitry of a device (or one or more hardware or software components thereof), such as those illustrated and described with reference to FIGS. 1 and 5.

The technique 600 includes an operation 602 to capture an image of a portion of a face of a user. The technique 600 includes an operation 604 to retrieve a registered model of the face. The registered model may include a facial feature (e.g., a preselected facial feature). The registered model may be retrieved based on identification information. The identification information may be determined from the captured image, for example using facial recognition of the face in the captured image, via metadata, or the like. In another example, the identification information may be determined from a user entered or selected identifier (e.g., a name, a username, an account number, or the like), which may be received with the captured image or separately from the captured image. The user may be authenticated based on the captured image without identifying the user from the captured image.

The registered model may be registered by receiving a selection of a preselected facial feature, generating a 3D model of the preselected facial feature from captured images of the preselected facial feature (e.g., of the user), and storing the 3D model of the preselected facial feature. In an example, registering the registered model may include determining, using a trained model, a most unique (or a threshold unique) aspect of a 3D model, and saving the most unique (or threshold unique) aspect as the facial feature. The registered model may include a temporal aspect. For example, the registered model may include a 4D model including a facial movement of the facial feature. When capturing the image of the portion of the face, the technique 600 may include capturing a gesture performed by the portion of the face. In an example, the technique 600 may include determining whether the user selected facial feature matches the preselected facial feature by determining whether the gesture corresponds to the facial movement of the 4D model. In an example, the preselected facial feature may be unique to a system or location corresponding to the secure content. In this example, authentication of the user for a second system or second location corresponding to second secure content may include using a second preselected facial feature of the registered model.

The technique 600 includes a decision operation 606 to compare the portion of the face to the facial feature. In response to determining that the portion of the captured image matches the facial feature (e.g., within a threshold match, or with a minimum number of points matching, etc.), the technique 600 continues to operation 608, In response to determining that the portion of the captured image does not match the facial feature, the technique 600 may continue to operation 610, or may attempt to repeat the process (e.g., by returning to operation 602, prompting the user, etc.). The facial feature may include a unique aspect of the user's face, such as a most unique feature or a feature more unique than other features of the user's face, or a feature that is threshold unique, such as a feature that is not detectable in a database of models (or only a few models match, such as under 5%). In an example, the facial feature may include a portion of an ear of the user, such as an ear lobe.

The technique 600 includes an operation 608 to grant access to the user to secure content. The technique 600 includes an operation 610 to deny access or end the technique 600. The technique 600 includes an operation 612 to receive a user selection of a facial feature.

The technique 600 includes a decision operation 614 to determine whether the user selected facial feature matches a preselected facial feature. The operations 612 and 614 may optionally occur before operation 604 or 606, or may occur after operation 606 (e.g., before granting access, such as when the outcome of operation 606 includes proceeding to operation 608).

The technique 600 may include generating an updated model from the registered model after granting access to the secure content, the updated model generated based on additional details of the user from the captured image or a subsequent captured image. The additional details may be related to at least one of an article of clothing, glasses, a hairstyle, a gait, a voice imprint, shoes, a watch, or jewelry of the user. The updated model may be used for subsequent authentication, such as within a particular time period after generating the updated model (e.g., within an hour, a day, etc.). The particular time period may be determined based on the nature of the additional details (e.g., for clothing, limited to a day, but for a voice imprint, may be used for a month). The subsequent authentication may occur at a different system or location from a system or location where access was granted to the secure content. The technique 600 may include, during use of the secure content, continuously reauthenticating the user (e.g., iterating all or part of the technique 600) based on subsequent images captured of the user.

Figure 7:
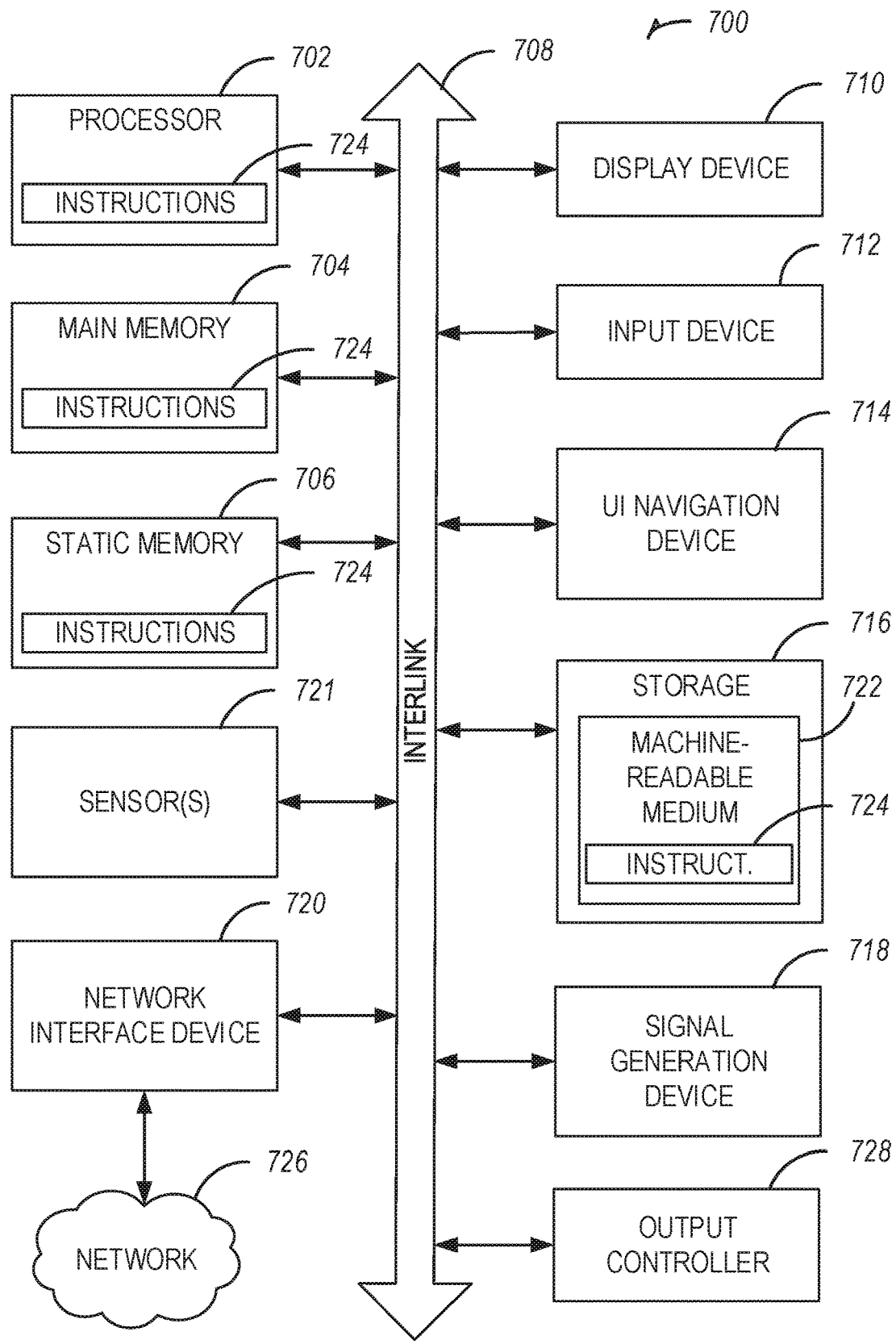
FIG. 7 illustrates generally an example of a block diagram of a machine upon which any one or more of the techniques discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet. PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating, A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse), In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure; or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only. Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Example 1 is a method comprising: capturing an image of a portion of a face of a user; retrieving, based on identification information, a registered model of the face from a database; receiving a user selection of a facial feature; determining whether the user selected facial feature matches a preselected facial feature of the registered model; in response to determining that the user selected facial feature matches the preselected facial feature, comparing the portion of the face in the captured image to the facial feature of the registered model; in response to determining that the portion of the captured image matches the facial feature of the registered model, granting access to the user to secure content.

In Example 2, the subject matter of Example 1 includes, wherein the identification information is determined from the captured image using facial recognition of the face in the captured image.

In Example 3, the subject matter of Examples 1-2 includes, wherein the registered model is registered by: receiving a selection of the preselected facial feature; generating a 3D model of the preselected facial feature from captured images of the preselected facial feature; storing the 3D model of the preselected facial feature.

In Example 4, the subject matter of Examples 1-3 includes, wherein registering the registered model includes determining, using a trained model, a most unique aspect of a 3D model, and saving the most unique aspect as the facial feature.

In Example 5, the subject matter of Examples 1-4 includes, wherein the registered model is a 4D model including a facial movement of the facial feature, wherein capturing the image of the portion of the face includes capturing a gesture performed by the portion of the face, and wherein determining whether the user selected facial feature matches the preselected facial feature, includes determining whether the gesture corresponds to the facial movement of the 4D model.

In Example 6, the subject matter of Examples 1-5 includes, wherein the facial feature includes a portion of an ear lobe.

In Example 7, the subject matter of Examples 1-6 includes, generating an updated model from the registered model after granting access to the secure content, the updated model generated based on additional details of the user from the captured image or a subsequent captured image, the additional details related to at least one of an article of clothing, glasses, a hairstyle, a gait, a voice imprint, shoes, a watch, or jewelry of the user.

In Example 8, the subject matter of Example 7 includes, wherein the updated model is used for subsequent authentication within a particular time period after generating the updated model, the subsequent authentication occurring at a different system or location from a system or location where access was granted to the secure content.

In Example 9, the subject matter of Examples 1-8 includes, during use of the secure content, continuously reauthenticating the user based on subsequent images captured of the user.

In Example 10, the subject matter of Examples 1-9 includes, wherein the identification information is received separately from the captured image, the identification information including at least one of a name, a username, or an account number.

In Example 11, the subject matter of Example 10 includes, wherein the user is authenticated based on the captured image without identifying the user from the captured image.

In Example 12, the subject matter of Examples 1-11 includes, wherein the preselected facial feature of the registered model is unique to a system or location corresponding to the secure content, and wherein authentication of the user for a second system or second location corresponding to second secure content includes a second preselected facial feature of the registered model.

Example 13 is a system comprising: an image capture device to capture an image of a portion of a face of a user; a display device; a processor; memory, including instructions, which when executed by the processor, cause the processor to: retrieve, based on identification information, a registered model of the face from a database; receive a user selection of a facial feature; determine whether the user selected facial feature matches a preselected facial feature of the registered model; in response to determining that the user selected facial feature matches the preselected facial feature, compare the portion of the face in the captured image to the facial feature of the registered model; in response to determining that the portion of the captured image matches the facial feature of the registered model, grant access to the user to secure content; and output an indication related to the secure content for display on the display device.

In Example 14, the subject matter of Example 13 includes, wherein to registering the registered model, the instructions further cause the processing circuitry to determine, using a trained model, a most unique aspect of a 3D model, and saving the most unique aspect as the facial feature.

In Example 15, the subject matter of Examples 13-14 includes, wherein the registered model is a 4D model including a facial movement of the facial feature, wherein to capture the image of the portion of the face, the instructions further cause the processing circuitry to capture a gesture performed by the portion of the face, and wherein to determine whether the user selected facial feature matches the preselected facial feature, the instructions further cause the processing circuitry to determine whether the gesture corresponds to the facial movement of the 4D model.

In Example 16, the subject matter of Examples 13-15 includes, wherein the facial feature includes a portion of an ear lobe.

In Example 17, the subject matter of Examples 13-16 includes, wherein the instructions further cause the processing circuitry to generate an updated model from the registered model after granting access to the secure content, the updated model generated based on additional details of the user from the captured image or a subsequent captured image, and the additional details related to at least one of an article of clothing, glasses, a hairstyle, a gait, a voice imprint, shoes, a watch, or jewelry of the user.

In Example 18, the subject matter of Example 17 includes, wherein the updated model is used for subsequent authentication within a particular time period after generating the updated model, the subsequent authentication occurring at a different system or location from a system or location where access was granted to the secure content.

In Example 19, the subject matter of Examples 13-18 includes, wherein the identification information is received separately from the captured image, the identification information including at least one of a name, a username, or an account number.

In Example 20, the subject matter of Examples 13-19 includes, wherein the preselected facial feature of the registered model is unique to a system or location corresponding to the secure content, and wherein authentication of the user for a second system or second location corresponding to second secure content includes a second preselected facial feature of the registered model.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
    capturing an image of a portion of a face of a user, wherein the user is wearing a facemask; retrieving, based on identification information, a registered 4D model of the face from a database;
    receiving a user selection of a facial feature, the user selection comprising an eye mannerism comprising an eyebrow movement;
    determining whether the user selected facial feature matches a preselected facial feature of the registered 4D model;
    in response to determining that the user selected facial feature matches the preselected facial feature, comparing the portion of the face in the captured image to the facial feature of the registered 4D model;
    in response to determining that the portion of the captured image matches the facial feature of the registered 4D model, granting access to the user to secure content, wherein the registered 4D model comprises the eyebrow movement, wherein capturing the image of the portion of the face includes capturing the eye mannerism performed by the eyebrow movement, and wherein determining whether the user selected facial feature matches the preselected facial feature includes determining whether the eye mannerism corresponds to the eyebrow movement.

2. The method of claim 1, wherein the identification information is determined from the captured image using facial recognition of the face in the captured image.

3. The method of claim 1, wherein the registered 4D model is registered by:
    receiving a selection of the preselected facial feature;
    generating a 3D model of the preselected facial feature from captured images of the preselected facial feature;
    storing the 3D model of the preselected facial feature.

4. The method of claim 1, wherein registering the registered 4D model includes determining, using a trained model, a most unique aspect of a 3D model, and saving the most unique aspect as the facial feature.

5. The method of claim 1, wherein the registered 4D model is a 4D model including a facial movement of the facial feature, wherein capturing the image of the portion of the face includes capturing a gesture performed by the portion of the face, and wherein determining whether the user selected facial feature matches the preselected facial feature, includes determining whether the gesture corresponds to the facial movement of the 4D model.

6. The method of claim 1, wherein the facial feature includes a portion of an ear lobe.

7. The method of claim 1, further comprising generating an updated model from the registered 4D model after granting access to the secure content, the updated model generated based on additional details of the user from the captured image or a subsequent captured image, the additional details related to at least one of an article of clothing, glasses, a hairstyle, a gait, a voice imprint, shoes, a watch, or jewelry of the user.

8. The method of claim 7, wherein the updated model is used for subsequent authentication within a particular time period after generating the updated model, the subsequent authentication occurring at a different system or location from a system or location where access was granted to the secure content.

9. The method of claim 1, further comprising, during use of the secure content, continuously reauthenticating the user based on subsequent images captured of the user.

10. The method of claim 1, wherein the identification information is received separately from the captured image, the identification information including at least one of a name, a username, or an account number.

11. The method of claim 10, wherein the user is authenticated based on the captured image without identifying the user from the captured image.

12. The method of claim 1, wherein the preselected facial feature of the registered 4D model is unique to a system or location corresponding to the secure content, and wherein authentication of the user for a second system or second location corresponding to second secure content includes a second preselected facial feature of the registered 413 model.

13. A system comprising:
    an image capture device to capture an image of a portion of a face of a user, wherein the user is wearing a facemask;
    a display device;
    a processor;
    memory, including instructions, which when executed by the processor, cause the processor to:
    retrieve, based on identification information, a registered 4D model of the face from a database;
    receive a user selection of a facial feature, the user selection comprising an eye mannerism comprising an eyebrow movement;
    determine whether the user selected facial feature matches a preselected facial feature of the registered 4D model;

in response to determining that the user selected facial feature matches the preselected facial feature, compare the portion of the face in the captured image to the facial feature of the registered 4D model;

in response to determining that the portion of the captured image matches the facial feature of the registered 4D model, grant access to the user to secure content, wherein the registered 4D model comprises the eyebrow movement, wherein capturing the image of the portion of the face includes capturing the eye mannerism performed by the eyebrow movement, and wherein determining whether the user selected facial feature matches the preselected facial feature includes determining whether the eye mannerism corresponds to the eyebrow movement; and output an indication related to the secure content for display on the display device.

14. The system of claim 13, wherein to registering the registered 4D model, the instructions further cause the processing circuitry to determine, using a trained model, a most unique aspect of a 3D model, and saving the most unique aspect as the facial feature.

15. The system of claim 13, wherein the registered 4D model is a 4D model including a facial movement of the facial feature, wherein to capture the image of the portion of the face, the instructions further cause the processing circuitry to capture a gesture performed by the portion of the face, and wherein to determine whether the user selected facial feature matches the preselected facial feature, the instructions further cause the processing circuitry to determine whether the gesture corresponds to the facial movement of the 4D model.

16. The system of claim 13, wherein the facial feature includes a portion of an ear lobe.

17. The system of claim 13, wherein the instructions further cause the processing circuitry to generate an updated model from the registered 4D model after granting access to the secure content, the updated model generated based on additional details of the user from the captured image or a subsequent captured image, and the additional details related to at least one of an article of clothing, glasses, a hairstyle, a gait, a voice imprint, shoes, a watch, or jewelry of the user.

18. The system of claim 17, wherein the updated model is used for subsequent authentication within a particular time period after generating the updated model, the subsequent authentication occurring at a different system or location from a system or location where access was granted to the secure content.

19. The system of claim 13, wherein the identification information is received separately from the captured image, the identification information including at least one of a name, a username, or an account number.

20. The system of claim 13, wherein the preselected facial feature of the registered 4D model is unique to a system or location corresponding to the secure content, and wherein authentication of the user for a second system or second location corresponding to second secure content includes a second preselected facial feature of the registered 413 model.

* * * * *

UNITED STATES PATENT AND TRADEMARK OFFICE
CERTIFICATE OF CORRECTION

| | | |
|---|---|---|
| PATENT NO. | : 11,907,346 B1 | Page 1 of 1 |
| APPLICATION NO. | : 17/248249 | |
| DATED | : February 20, 2024 | |
| INVENTOR(S) | : Ramanathan et al. | |

It is certified that error appears in the above-identified patent and that said Letters Patent is hereby corrected as shown below:

In the Claims

In Column 14, Line 51, in Claim 12, delete "413" and insert --4D-- therefor

In Column 16, Line 28, in Claim 20, delete "413" and insert --4D-- therefor

Signed and Sealed this
Thirtieth Day of July, 2024

Katherine Kelly Vidal
*Director of the United States Patent and Trademark Office*